United States Patent [19]

Takayama et al.

[11] Patent Number: 5,122,553

[45] Date of Patent: Jun. 16, 1992

[54] HARDENABLE UNSATURATED POLYESTER RESIN COMPOSITIONS

[76] Inventors: Yuji Takayama, 2-1 Aza-Higashiura, Kitayama-cho, Toyohashi-shi, Aichi-ken; Mitsuo Kinoshita, 5-8 Nishikata-Agehama, Mito-cho, Hoi-gun, Aichi-ken; Shigeru Imamura, 4-68-12 Mori, Toyokawa-shi, Aichi-ken; Hirokazu Matsueda, 4-3-8 Nishiotakano, Toyohashi-shi, Aichi-ken, all of Japan

[21] Appl. No.: 518,288

[22] Filed: May 4, 1990

Related U.S. Application Data

[63] Continuation-in-part of Ser. No. 282,825, Dec. 7, 1988, abandoned, which is a continuation-in-part of Ser. No. 13,905, Feb. 12, 1987, abandoned.

[30] Foreign Application Priority Data

| Feb. 22, 1986 [JP] | Japan | 61-37958 |
| Jun. 23, 1986 [JP] | Japan | 61-146675 |
| Jun. 25, 1986 [JP] | Japan | 61-148396 |

[51] Int. Cl.$^5$ .................................................. C08L 67/06
[52] U.S. Cl. ............................................ 523/514; 523/522; 525/43; 525/69; 525/91; 525/171; 525/333.2
[58] Field of Search .................... 525/90, 91, 171, 43, 525/69; 523/514, 522

[56] References Cited

U.S. PATENT DOCUMENTS

| 3,705,208 | 12/1972 | Nakamuta | 525/171 |
| 4,287,313 | 9/1981 | Uber | 525/91 |
| 4,670,485 | 6/1987 | Hesse | 523/436 |

FOREIGN PATENT DOCUMENTS 1152682  8/1983  Canada .................................. 525/44

*Primary Examiner*—Patricia Short
*Attorney, Agent, or Firm*—Heller, Ehrman, White, McAuliffe

[57] ABSTRACT

A hardenable unsaturated polyester resin composition contains block copolymers and unsaturated polyester. The block copolymer includes both polyester blocks and a polydiene block as constituent segments.

6 Claims, No Drawings

HARDENABLE UNSATURATED POLYESTER
RESIN COMPOSITIONS

This is a continuation-in-part of U.S. application Ser. No. 282,825 filed Dec. 7, 1988, now abandoned, which was a continuation-in-part of U.S. application Ser. No. 013,905 filed Feb. 12, 1987, now abandoned.

BACKGROUND OF THE INVENTION

This invention relates to hardenable unsaturated polyester resin compositions.

Hardenable unsaturated polyester resin compositions are widely used not only as sheet mold compositions (SMC) and bulk mold compositions (BMC) but also for wet molding methods such as the so-called matched die method as well as the RIM method which is a method of injecting resin.

Thermosetting unsaturated polyester resins are known to have large molding shrinkage as they harden at the time of molding. In order to improve the accuracy in measurements as well as other physical characteristics such as impact strength of their molded products, it has been common practice to add thermoplastic high-molecular compounds to such unsaturated polyester compounds. If these compounds are simply mixed together to make a composition, however, the surface quality of its molded products becomes extremely poor and desired levels of improvement in reducing shrinkage and increasing impact strength can hardly be attained. Moreover, such compositions have poor workability in molding processes because they generally do not have sufficient compatibility and/or dispersibility.

According to a widely used conventional method, carboxyl groups are introduced into the molecules of high-molecular compounds to be added to thermosetting unsaturated polyester resins so as to combine these carboxyl groups with the carboxyl end groups of the thermosetting unsaturated polyester resins through an oxide or hydroxide of an alkaline earth metal such as magnesium oxide. Some effects are observed in this case if one uses, as the high-molecular compound to be added, a copolymer of methacrylic acid or acrylic acid and methyl methacrylate, vinyl acetate or styrene. With compositions of this kind, however, one can hardly expect any improvement in physical characteristics of the type mentioned above for their molded products.

In order to improve the impact strength of molded products, one may think of diene polymers as the high-molecular compounds to be added. If such compounds are used in a similar manner, however, lustre spots become conspicuous on the surface of the molded products obtained from such compositions. Such products are inferior also in other physical characteristics, showing no advantageous effects of introducing carboxyl groups into diene polymers. Although diene polymers with carboxyl groups in them are soluble in a styrene monomer which is a monomer component used for hardenable unsaturated polyester resin compositions, they separate into layers extremely quickly if there is in coexistence an $\alpha, \beta$-ethylenically unsaturated polyester or the like. This is probably because compatibility and/or dispersibility is so poor between diene-type polymers with carboxyl groups and thermosetting unsaturated polyester resins that, even if magnesium oxide or the like is added to them, a large portion of them becomes separated before their combination through salification, thereby preventing improvement of the physical characteristics of molded products.

In order to improve compatibility and dispersibility with thermosetting unsaturated polyester resins, compositions containing block copolymers with polystyrene block have been considered (Japanese Patent Publications Tokkai 53-74592 and 60-99158). Although they do succeed to some extent in improving compatibility and dispersibility, molded products obtained from these compositions are inferior regarding molding shrinkage and in particular regarding impact strength because use is made of block copolymers depending on polystyrene which is basically not sufficiently tough.

SUMMARY OF THE INVENTION

It is therefore an object of the present invention to provide hardenable unsaturated polyester resin compositions which have sufficient compatibility and/or dispersibility as well as superior workability in molding processes and are capable of providing improved physical characteristics such as surface appearance, mold shrinkage and impact strength to their molded products.

The present invention is based on the discovery made by the present inventors that the aforementioned and other objects of the present invention are attained by compositions obtained by causing thermosetting unsaturated polyester resins to contain block copolymers having as segments one or more polyester blocks and a polybutadiene or a hydrogenated polybutadiene (hereinafter referred to as polydiene block).

DETAILED DESCRIPTION OF THE INVENTION

In summary, the present invention relates to hardenable unsaturated polyester resin compositions comprising a block copolymer of the form $X-(Y)_n$, an unsaturated polyester, a vinyl monomer and a curing catalyst, where X is polybutadiene block or hydrogenated polybutadiene block, Y is polyester block obtained by condensation of monomers consisting of one or more organic dicarboxylic anhydrides selected from phthalic anhydride, succinic anhydride, cyclohexane dicarboxylic anhydride, and one or more of 1,2-epoxides selected from the group consisting of ethylene oxide, propylene oxide and butylene oxide, X and Y are connected by ester linkage, n is an integral equal to or greater than 1, and $X-(Y)_n$ is obtained by starting with carboxylic acid group or hydroxyl group in polybutadiene or hydrogenated polybutadiene and by alternate condensation of said organic dicarboxylic anhydride and said 1,2-epoxide therewith in the presence of catalyst. According to the present invention, the block copolymer has, as constituent segments, a polybutadiene or a hydrogenated polybutadiene block and one or more polyester blocks obtained by alternate condensation or organic dicarboxylic anhydride and 1,2-epoxide.

The aforementioned block copolymers of the present invention can be obtained stably in an industrially advantageous manner by starting with a polydiene having within its molecule one or more active hydrogen group such as hydroxyl groups and carboxyl groups and causing it to react alternately with an organic dicarboxylic anhydride and 1, 2-epoxide in the presence of a catalyst, thereby forming polyester chains by condensation through the active hydrogen groups of the polydiene. Alternatively, they may be obtained by starting with a polydiene having within its molecule one or more hydroxyl groups and forming polyester chains through the hydroxyl groups of the polydiene through sequential ring-opening polymerization of ε-lactone in the presence of a catalyst. The polyester chains may also be connected to a polydiene either directly or indirectly by using a crosslinking agent.

As starting material for obtaining block copolymers of the present invention, hydroxyl or carboxyl modified polybutadienes or hydrogenated polybutadienes having one or more hydroxyl or carboxylic acid group or groups in the molecule can be used. Examples of modified polydiene which can be used advantageously in the present invention include α, ω-1, 2-polybutadiene glycol (Nisso PB-G series produced by Nippon Soda, Inc.), α, ω-1, 2-polybutadiene dicarboxylic acid (Nisso PB-C series produced by Nippon Soda, Inc.), end carboxyl modified 1, 4-polybutadiene (Hycar CTB series produced by the Ube Kosan, Inc. or B.F. Goodrich, Inc.), end hydroxy group modified 1, 4-polybutadiene (Poly-bd R-45M or R-45HT produced by Idemitsu Sekiyu Kagaku, Inc. or Arco Chemical, Inc.) and those obtained by either partially or wholly hydrogenating the aforementioned compounds such as hydrogenated α, ω-1, 2-polybutadiene glycol (Nisso PB-GI series produced by Nippon Soda, Inc.) and hydrogenated α, ω-1, 2-polybutadiene dicarboxylic acid (Nisso PB-CI series produced by Nippon Soda, Inc.).

Examples of organic dicarboxylic anhydride used in the aforementioned examples of production processes include aliphatic dicarboxylic anhydrides such as succinic anhydrides, and alkenyl succinic anhydrides, aromatic dicarboxylic anhydrides such as phthalic anhydrides and naphthalene dicarboxylic anhydrides and alicyclic dicarboxylic anhydrides such as cyclohexane dicarboxylic anhydrides, cyclohexene dicarboxylic anhydrides and end methylene cyclohexene dicarboxylic anhydrides. Examples of 1, 2-epoxides in the same examples of production processes include ethylene oxide, propylene oxide and 1, 2-butylene oxide. Examples of catalysts in still the same examples of production processes include lithium halides such as lithium chloride and lithium bromide and tetra-alkyl quaternary ammonium salts such as tetramethyl ammonium bromide, tributylmethyl ammonium bromide and tetrapropyl ammonium chloride.

Examples of ε-aliphatic lactone in the aforementioned ring-opening polymerization of ε-aliphatic lactone: for the formation of polyester chains in polydiene include ε-caprolactone. Examples of catalyst used for sequential ring-opening polymerization of ε-aliphatic lactone to hydroxyl groups which exist as functional groups of polydiene include anionic polymerization catalysts, coordination anionic polymerization catalysts and cationic polymerization catalysts, as described in "Lectures on the Theories of Polymerization Reactions, Vol. 7, Ring-Opening Polymerization II" (published by Kagaku Dojin) at page 108. In particular, titanate catalysts such as tetrabutyl titanate, tetrapropyl titanate and tetraethyl titanate and tin catalysts such as dibutyltin oxide, tin octylate and stannous chloride. It goes without saying that none of the examples disclosed above is intended to limit the scope of the present invention.

The polyester blocks in these block copolymers can be selected appropriately in view of the type of thermosetting unsaturated polyester resin which is used together. In general, poly-(propylene glycol phthalate), poly-(ethylene glycol phthalate-succinate) and poly-(butylene gylcol succinate) are considered for polyester blocks because they are compatible and dispersible with relatively many kinds of thermosetting unsaturated polyester resins.

Tests on compatibility and dispersibility with thermosetting unsaturated polyester resins will be described below. Even if compatibility and/or dispersibility of these resins with the block copolymers is not completely satisfactory, sufficient compatibility and/or dispersibility can be attained by making the terminal groups of the polyester blocks in the form of carboxylic acid and adding magnesium oxide, magnesium hydroxide or the like as a thickener. The terminal carboxylic acid group of the polyester blocks may be formed by the reaction of dicarboxylic acid anhydride with a terminal hydroxyl group of the polyester block. Examples of dicarboxylic acid anhydride which may preferably be used include succinic anhydride, phthalic anhydride and their mixtures.

The ratio of polyester blocks contained in the block copolymer also contributes to compatibility and dispersibility with thermosetting unsaturated polyester resins. In general, compatibility and dispersibility increase if the ratio of polyester blocks is made higher. They decrease if the ratio is made lower.

In order to improve the impact strength and surface characteristics of the molded products, the ratio of polyester blocks within the block copolymer should be made as low as possible while compatibility and dispersibility with thermosetting unsaturated polyester resins are taken into consideration. If the main purpose is to improve the thermal strength of the molded products, or to lower the temperature-dependence of their shear and tensile strength while maintaining their surface characteristics, on the other hand, the ratio of polyester blocks within the lock copolymer should preferably be increased. In general, the ratio of polyester blocks within the block copolymer of the present invention should preferably be between 10 and 60 weight %.

The block copolymers of the present invention are generally used by making a 25–40% solution with a vinyl monomer such as styrene monomer and mixing this solution at 20–50% with respect to thermosetting unsaturated polyester resins. Depending on the kind of block copolymer, however, the aforementioned step of preparing a solution in a vinyl monomer such as styrene monomer may be omitted before it is added to thermosetting unsaturated polyester resins. In such a situation, an appropriate amount of vinyl monomers may be added to the thermosetting unsaturated polyester resins before the block copolymer is added.

Unsaturated polyesters used for the purposes of the present invention include condensation products of α,β-ethylenically unsaturated dicarboxylic acid and glycol. In the production of unsaturated polyester, saturated dicarboxylic acid or aromatic dicarboxylic acid may be used supplementarily as dibasic carboxylic acid. Examples of α,β-ethylenically unsaturated dicarboxylic acid include maleic acid, fumaric acid and itaconic acid. Examples of dicarboxylic acid which may be used supplementarily include adipic acid, sebacic acid, succinic acid, phthalic acid and isophthalic acid. Examples of glycol include alkane diol such as ethylene glycol, 1,2-propylene glycol, 1,4-butanediol and neopentyl glycol. Unsaturated polyester obtained from the condensation of the dibasic acid and glycol has usually average molecular weight between 800 and 4000 and acid value between 20 and 60. Examples of vinyl monomer which may be used in the present invention include styrene, methacrylate and diallyl phthalate.

As explained above, styrene monomer is usually used as the solvent in the compositions embodying in the present invention. As for curing catalysts which may be used in connection with the present invention, use may be made of anything that is dissociated at curing temperature to generate free radicals and to initiate polymerization of unsaturated polyesters and vinyl monomers. Examples of such curing catalysts include t-butyl-peroxy benzoate, benzoyl peroxide and cumyl peroxide.

The simplest compositions embodying the present invention are mixtures of the aforementioned block copolymer, and thermosetting unsaturated polyester resin, vinyl monomer and curing catalyst. If the matched die method, the resin injection method (the RIM method), the hand lay-up method or the filament winding method is used for the molding, a small amount of curing catalyst or mold release agent may be appropriately added to such a simple composition. In addition to these so-called resins, premixed molding compositions such as SMC and BMC may contain calcium carbonate, etc. as a filler, oxides or hydroxides of magnesium as thickener if necessary, metallic soap as a mold release agent and glass fibers as a reinforcing agent. The mixing ratios and methods are not different from the case of known compositions.

In what follows, examples of block copolymers are described in order to more clearly explain the present invention but the present invention is not intended to be limited by these examples. Any modifications and variations based on the fundamental idea of the present invention as described above are intended to be included within the scope of this invention.

EXAMPLES

Production: Example No. 1

Placed inside an autoclave were 52.3 g (0.35 moles) of phthalic anhydride, 82.5 g (0.825 moles) of succinic anhydride, and as catalysts 0.7 g of lithium chloride and 715 g (0.5 moles) of $\alpha, \omega$-1, 2-polybutadiene glycol (Nisso PB-G1000 with average molecular weight of 1430 produced by Nippon Soda, Inc.). After nitrogen gas was introduced into the reacting system, it was heated to 130° C. with stirring. Next, 42.7 g (0.74 moles) of propylene oxide was introduced over a period of one hour. The reaction was completed after two hours of aging at 130° C. and 890 g of a yellowish transparent viscous liquid product was obtained. The molecular weight of this polybutadine-polyester block copolymer thus obtained was 1786 (hereinafter always the calculated value) and the ratio of polyester blocks was 20.0 weight % (hereinafter written simply as "%"). Its acid value was 27 and its hydroxyl value was 38.

Production: Example No. 2

Placed inside a flask were 800 g (0.448 moles) of the block copolymer obtained in Example No. 1 and 54.2 g (0.54 moles) of succinic anhydride for a reaction at 120°–125° C. in a nitrogen gas flow for a period of two hours. After the contents were cooled to 50° C., 214 g of styrene monomer was added to prepare a styrene solution containing 80 weight % of block copolymer. The acid value of this styrene solution containing the block copolymer was 50.7 and its hydroxyl value was 1.9. Polybutadiene-polyester block copolymer with carboxyl modified ends of polyester chains was obtained.

Production: Example No. 3

Placed inside an autoclave were 166.5 g (1.67 moles) of succinic anhydride, 105.2 g (0.71 moles) of phthalic anhydride, 1430 g (1 mole) of $\alpha, \omega$-1, 2-polybutadiene glycol (as used in Example No. 1) and 0.6 g of lithium chloride. After nitrogen gas was introduced into the reacting system, it was heated to 103° C. with stirring. Next, 86.3 g (1.49 moles) of propylene oxide was introduced over a period of 40 minutes at 125°–130° C. The reaction was completed after two hours of aging at this temperature to obtain polybutadiene-polyester block copolymer. After this was cooled, 447 g of styrene monomer was added to dissolve and dilute it and a styrene solution containing 80 weight % of the aforementioned block copolymer was prepared. The molecular weight of the polybutadiene-polyester block copolymer thus obtained was 1787 and the ratio of polyester blocks was 20%. The acid value of its styrene solution was 25.6 and its hydroxyl value was 26.3.

Test No. 1

Use was made of 33% styrene solutions of the block copolymers obtained in Examples Nos. 1 and 2 to test compatibility and/or dispersibility with the following thermosetting unsaturated polyester resins: Yupika 7507 (produced by Nippon Yupika, Inc.), Polyset 9120, Polyset 9107, Polyset 2212 and Polyset 6200 (the last four produced by Hitachi Kasei, Inc.). Phase separation of about 10% was observed in 24 hours only in the combination of the block copolymer of Example No. 2 and Polyset 9107. With the other combinations, no phase separation was observed even without a thickener.

Accordingly, it was anticipated that molded products with uniform surface lustre would be obtainable by many molding methods if aforementioned combinations were used. Thus, for each of the two kinds of block polymers, a liquid with 40 parts of 33% styrene solution, 60 parts of Yupika 7507, 1.5 parts of tertiary butyl perbenzoate and 3.0 parts of zinc stearate was prepared inside a Banbury mixer into which 200 parts of calcium carbonate powder were added and after the mixture became uniform, 60 parts of glass fibers of ½ inch in length were added. One minute later, the mixer was stopped and a premix was obtained. These premixes are based on the compositions of the present invention. Products formed therefrom at mold temperature of 145 were found to have uniform surface luster. The molding shrinkage was 0.004% when use was made of the block copolymer of Example No. 1 and 0.005% with the block copolymer of Example No. 2. The Izod impact strength was 17.0 ft-lb/inch when use was made of the block copolymer of Example No. 1 and 17.4 ft-lb/inch with the block copolymer of Example No. 2.

The premixture which is obtainable in the same way as described above except $\alpha, \omega$-1, 2-polybutadiene glycol (described in Example No. 1) is substituted for the block copolymer is a know composition but the surface of its molded products was full of spots and cosmetically much inferior. Its Izod impact strength was 11.8 ft-lb/inch.

Test No. 2

A 33% styrene solution of the block copolymer obtained in Example No. 3 was prepared. Uniformly mixed with 40 parts of this solution were 60 parts of Polyset 9120, 3 parts of zinc stearate, 1.5 parts of tertiary butyl perbenzoate, 140 parts of calcium carbonate powder and 0.3 parts of parabenzoquinone, and 2 parts of magnesium oxide was subsequently added to immediately produce a composition for SMC containing glass fibers of 1 inch in length. This composition which embodies the present invention was used to produce molded products with mold temperature of 140° C. Although some cloudiness was observed on the surface, the surface lustre was generally uniform and the molding shrinkage was 0.06%.

For comparison, use was made of a known composition for SMC obtained by the same method as described above except the block copolymer was substituted by α, ω-1, 2-polybutadiene glycol (described in Example No. 1). The surface of its molded products was full of lustre spots and running designs were also observable. The molding shrinkage was −0.20%. In this situation, the dope stability was poor before the addition of magnesium oxide and phase separation was clearly observable. In this respect, too, it was clear that its industrial application is extremely difficult.

Test No. 3

Added into 500 parts each of 33% styrene solutions of the two block copolymers obtained in Examples Nos. 1 and 2 were 500 parts of Polylight PC-670 (produced by Dai Nippon Ink, Inc.) as thermosetting unsaturated polyester resin. Into this were dissolved 60 parts of cobalt naphthenate to obtain a liquid with viscosity of 830 centipoise. As this liquid was directed into a resin injection mold (called RIM or RTM) with a glass mat, acetyl aceton peroxide was introduced into the mold by a pump such that its ratio in the mixture would be 1%. The liquid inlet of the mold had a diameter of 20 mm and the mold temperature at the time was 25° C. The mold temperature began to rise two hours later because of the heat of polymerization and a maximum temperature of 70° C. was reached three hours later. The mold was opened three hours still later to take out the product. The product has a uniform exterior and there were no lustre spots. The surface was much smoother than that of a comparison product obtained in the same manner as described above except the block copolymer was not used. No glass fibers were observable from outside.

Production: Example No. 4

Placed inside an autoclave were 52.3 g (0.35 moles) of phthalic anhydride, 82.5 g (0.825 moles) of succinic anhydride, 0.7 g of lithium chloride as catalyst and 700 g (0.5 moles) of hydrogenated α, ω-1, 2-polybutadiene glycol (Nisso PB-GI1000 with average molecular weight of 1400 and iodine value of 6, produced by Nippon Soda, Inc.) and after nitrogen gas was introduced into the reacting system, the mixture was heated to 130° C. with stirring. Next, 42.7 g (0.74 moles) of propylene oxide was introduced over a period of one hour. After two hours of aging at 130° C., the reaction was completed to obtain 875 g of a yellowish transparent viscous liquid product. The molecular weight of the hydrogenated polybutadiene-polyester block copolymer thus obtained was 1755. The ratio of polyester blocks was 20.2 weight %, its acid value was 28 and its hydroxyl value was 39.

Production: Example No. 5

Placed inside a flask were 786 g (0.448 moles), of the block copolymer obtained in Example No. 4 and 54.2 g (0.54 moles) of succinic anhydride for a reaction at 120°-125° C. in a nitrogen gas flow for a period of two hours. After the contents were cooled to 50° C., 210 g of styrene monomer was added to prepare a styrene solution containing 80 weight % of block copolymer. The acid value of this styrene solution containing block copolymer was 51.5 and its hydroxyl value was 0.8. Hydrogenated polybutadiene-polyester block copolymer with carboxyl modified ends of polyester blocks was thus obtained.

Production: Example No. 6

Placed inside an autoclave were 166.5 g (1.67 moles) of succinic anhydride, 105.2 g (0.71 moles) of phthalic anhydride, 1400 g (1 mole) of hydrogenated α, ω-1, 2-polybutadiene glycol (as used in Example No. 4) and 0.6 g of lithium chloride and after nitrogen gas was introduced into the system, the mixture was heated to 130° C. with stirring. Next, 86.3 g (1.49 moles) of propylene oxide was introduced in over a period of 40 minutes at 125°-130° C. After two hours of aging at this temperature, the reaction was terminated to obtain hydrated polybutadiene-polyester block copolymer. After this was cooled, it was dissolved and diluted by adding 439 g of styrene monomer and a styrene solution containing 80 weight % of the aforementioned styrene solution was obtained. The molecular weight of the hydrogenated polybutadiene-polyester block copolymer thus obtained is 1758. The ratio of polyester blocks was 20.4%. The acid value of its styrene solution was 26.0 and its hydroxyl value was 26.7.

Test No. 4

Use was made of 33% styrene solutions of the block copolymers obtained in Examples Nos. 4 and 5 to test compatibility and/or dispersibility with the following thermosetting unsaturated polyester resins: Yupika 7507 (produced by Nippon Yupika, Inc.), Polyset 9120, Polyset 9107, Polyset 2212 and Polyset 6200 (the last four produced by Hitachi Kasei, Inc.). Phase separation of about 10% was observed in 24 hours only in the combination of the block copolymer of Example No. 5 and Polyset 8107. With the other combinations, no phase separation was observed even without a thickener.

Accordingly, it was anticipated that molded products with uniform surface lustre would be obtainable by many molding methods if aforementioned combinations were used. Thus, for each of the two kinds of block polymers, a liquid with 40 parts of 33% styrene solution, 60 parts of Yupika 7507, 1.5 parts of tertiary butyl perbenzoate and 3.0 parts of zinc stearate was prepared inside a Banbury mixer into which 200 parts of calcium carbonate powder were added and after the mixture became uniform, 60 parts of glass fibers of ½ inch in length were added. One minute later, the mixer was stopped and a premix was obtained. These premixes are based on the compositions of the present invention. Products formed therefrom at mold temperature of 140° C. were found to have uniform surface luster. The molding shrinkage was less than 0.004% when use was made of the block copolymer of Example No. 4 and less than 0.005% with the block copolymer of Example No. 5.

The premixture which is obtainable in the same way as described above except hydrogenated α, ω-1, 2-polybutadiene glycol (described in Example No. 1) is substituted for the block copolymer is a known composition but the surface of its molded products was full of spots and cosmetically much inferior.

Test No. 5

A 33% styrene solution of the block copolymer obtained in Example No. 6 was prepared. Uniformly mixed with 40 parts of this solution were 60 parts of Polyset 9120, 3 parts of zinc stearate, 1.5 parts of tertiary butyl perbenzoate, 140 parts of calcium carbonate powder and 0.3 parts of parabenzoquinone, and 2 parts of magnesium oxide was subsequently added to immediately produce an SMC containing glass fibers of 1 inch in length. This composition which embodies the present invention was used to produce molded products with mold temperature of 140° C. Although some cloudiness was observed on the surface, the surface lustre was generally uniform and the molding shrinkage was 0.05%.

For comparison, use was made of an SMC obtained by the same method as described above except the block copolymer was substituted by hydrogenated $\alpha$, $\omega$-1, 2-polybutadiene glycol (described in Example No. 4). The surface of its molded product was full of lustre spots and running designs were also observable. The molding shrinkage was −0.25%. In this situation, the dope stability was poor before the addition of magnesium oxide and phase separation was clearly observable. In this respect, too, it was clear that its industrial application is extremely difficult.

Test No. 6

Added into 500 parts each of 33% styrene solutions of the two block copolymers obtained in Examples Nos. 4, and 5 were 500 parts of Polylight PC-670 (produced by Dai Nippon Ink, Inc.) as thermosetting unsaturated polyester resin. Into this were dissolved 60 parts of cobalt naphthenate to obtain a liquid with viscosity of 830 centipoise. As this liquid was directed into a resin injection mold (called RIM or RTM) with a glass mat, acetyl aceton peroxide was introduced into the mold by a pump such that its ratio in the mixture would be 1%. The liquid inlet of the mold had a diameter of 20 mm and the mold temperature at the time was 25° C. The mold temperature began to rise two hours later because of the heat of polymerization and a maximum temperature of 70° C. was reached three hours still later. The mold was opened still three hours later to take out the product. The product had a uniform exterior and there were no lustre spots. The surface was much smoother than that of a comparison product obtained in the same manner as described above except the block copolymer was not used. No glass fibers were observable from outside.

Production: Example No. 7

Placed inside a reaction tank were 700 g (0.5 moles) of hydrogenated $\alpha$, $\omega$-1, 2-polybutadiene glycol (Nisso PB-GI1000 with average molecular weight of 1400, produced by Nippon Soda, Inc.), 0.7 g of tetrabutyl titanate as catalyst and 300 g (2.63 moles) of $\epsilon$-caprolactone for a reaction at 150° C. in an atmosphere of nitrogen gas for three hours to obtain 997 g of a yellowish transparent viscous liquid product. The molecular weight of this hydrogenated polybutadiene-polycaprolactone block copolymer was 2000. The ratio of polyester blocks composed of polycaprolactone was 30.0%. Its acid value was 0.3 and its hydroxyl value was 54.6.

Production: Example No. 8

Placed inside a flask were 800 g (0.4 moles) of the block copolymer obtained in Example No. 7 and 80 g (0.8 moles) of succinic anhydride for a reaction at 120°–125° C. in a flow of nitrogen gas for two hours. After the contents were cooled to 50° C., 210 g of styrene monomer was added to prepare a styrene solution containing 80 weight % of block copolymer. The acid value of this styrene solution containing block copolymer was 50.2 and its hydroxyl value was 1.2. Hydrogenated polybutadiene-polyester block copolymer with carboxyl modified ends of polyester blocks was thus obtained.

Production: Example No. 9

Placed into an autoclave were 760 g (0.5 moles) of $\alpha$, $\omega$-1, 2-polybutadiene dicarboxylic acid (Nisso PB-C1000 with average molecular weight of 1520, produced by Nippon Soda, Inc.) and 1.5 g of lithium chloride. After nitrogen gas was introduced into the system, the mixture was heated to 130° C. with stirring. Next, 48.4 g (1.1 moles) of ethylene oxide was introduced at 135°–145° C. over a period of 30 minutes. After two hours of aging at this temperature, the reaction was terminated to obtain 805 g of $\alpha$, $\omega$-1, 2-polybutadiene dicarboxylic acid dihydroxy-ethylate. Next, 0.5 g of tetrabutyl titanate as catalyst and 798 g (7 moles) of $\epsilon$-caprolactone were added for a reaction at 145°–150° C. in a flow of nitrogen gas for a period of four hours to obtain about 1600 g of yellowish transparent viscous liquid product.

The molecular weight of polybutadiene-polycaprolactone block copolymer thus obtained was 3204. The ratio of polyester blocks was 52.6%. Its acid value was 1.2 and its hydroxyl value was 34.7.

Test No. 7

Use was made of a 33% styrene solution of the block copolymers obtained in Example No. 8 to test compatibility and/or dispersibility with the following thermosetting unsaturated polyester resins: Yupika 7507 (produced by Nippon Yupika, Inc.), Polyset 9120, Polyset 9107, Polyset 2212 and Polyset 6200 (the last four produced by Hitachi Kasei, Inc.). Phase separation of about 5% was observed in 24 hours only in the case of Polyset 9107. With the other combinations, no phase separation was observed even without a thickener.

Accordingly, it was anticipated that molded products with uniform surface lustre would be obtainable by many molding methods if aforementioned combinations were used. Thus, a liquid with 40 parts of 33% styrene solution of the block copolymer of Example No. 8, 60 parts of Yupika 7507, 1.5 parts of tertiary butyl perbenzoate and 3.0 parts of zinc stearate was prepared inside a Banbury mixer into which 200 parts of calcium carbonate powder were added and after the mixture became uniform, 60 parts of glass fibers of ½ inch in length were added. One minute later, the mixer was stopped and a premix was produced. This premix embodies the present invention. Products formed therefrom at mold temperature of 145° C. were found to have uniform surface luster. The molding shrinkage was 0.003%.

The premixture which is obtainable in the same way as described above except hydrogenated $\alpha$, $\omega$-1, 2-polybutadiene glycol (described in Example No. 7) is used instead of the block copolymer is a known composition but the surface of its molded products was full of spots and cosmetically much inferior.

Test No. 8

A 33% styrene solution of the block copolymer obtained in Example No. 8 was prepared. Uniformly mixed with 40 parts of this solution were 60 parts of Polyset 9120, 3 parts of zinc stearate, 1.5 parts of tertiary butyl perbenzoate, 140 parts of calcium carbonate powder and 0.3 parts of parabenzoquinone and 2 parts of magnesium oxide was subsequently added to immediately produce an SMC containing glass fibers of 1 inch in length. This composition which embodies the present invention was used to produce molded products with mold temperature of 140° C. Although some cloudiness was observed on the surface, the surface lustre was generally uniform and the molding shrinkage was 0.04%.

For comparison, use was made of an SMC obtained by the same method as described above except the block copolymer was substituted by hydrogenated α, ω-1, 2-polybutadiene glycol (described in Example No. 7). The surface of its molded product was full of lustre spots and running designs were also observable. The molding shrinkage was −0.25%. In this situation, the dope stability was poor before the addition of magnesium oxide and phase separation was clearly observable. In this respect, too, it was clear that its industrial application is extremely difficult.

Test No. 9

Added into 500 parts of 33% styrene solution of the block copolymer obtained in Example No. 7 were 500 parts of Polylight PC-670 (produced by Dai Nippon Ink, Inc.) as thermosetting unsaturated polyester resin. Into this were dissolved 60 parts of cobalt naphthenate to obtain a liquid with viscosity of 830 centipoise. As this liquid was directed into a resin injection mold (called RIM or RTM) with a glass mat, acetyl aceton peroxide was introduced into the mold by a pump such that its ratio in the mixture would be 1%. The liquid inlet of the mold had a diameter of 20 mm and the mold temperature at the time was 25° C. The mold temperature began to rise two hours later because of the heat of polymerization and a maximum temperature of 70° C. was reached three hours still later. The mold was opened still three hours later to take out the product. The product was much smoother than that of a comparison product obtained in the same manner as described above except the block copolymer was not used. No glass fibers were observable from outside.

The results of these tests clearly indicate that the compositions according to the present invention provide sufficient compatibility and/or dispersibility as well as excellent workability, and are capable of improving the physical characteristics of molded products such as the surface characteristics and molding shrinkage.

What is claimed:

1. A hardenable unsaturated polyester resin composition comprising a block copolymer of the form $X\text{-}(Y)_n$, an unsaturated polyester, a vinyl monomer and a curing catalyst, where
   X is polybutadiene block or hydrogenated polybutadiene block,
   Y is polyester block obtained by condensation of monomers consisting of one or more organic dicarboxylic anhydrides selected from phthalic anhydride, succinic anhydride, cyclohexane dicarboxylic anhydride, and one or more of 1,2-epoxide selected from the group consisting of ethylene oxide, propylene oxide and butylene oxide,
   X and Y are connected by ester linkage,
   n is an integer equal to or greater than 1, and
   $X\text{-}(Y)_n$ is obtained by starting with carboxylic acid group or hydroxyl group in polybutadiene or hydrogenated polybutadiene and by alternate condensation of said organic dicarboxylic anhydride and said 1,2-epoxide therewith in the presence of a catalyst.

2. The composition of claim 1 for SMC or BMC further comprising a filler, a mold release agent and reinforcing fibers.

3. The composition of claim 2 further comprising a thickener selected from magnesium oxide and magnesium hydroxide.

4. The composition of claim 1 wherein said block copolymer contains 10-60 wt % of said polyester block.

5. The composition of claim 1 wherein said polyester block has terminal carboxylic acid group formed by the reaction of succinic and/or phthalic anhydride with a terminal hydroxyl group of said polyester block.

6. The composition of claim 1 wherein said unsaturated polyester includes one or more selected from the group consisting of α, β-ethylenically unsaturated polyester.

* * * * *